Dec. 10, 1935.                H. NEHLSEN                2,023,851
         SPEED CONTROL FOR SHEARS FOR CUTTING ROLLED MATERIAL
                        Filed Aug. 22, 1934
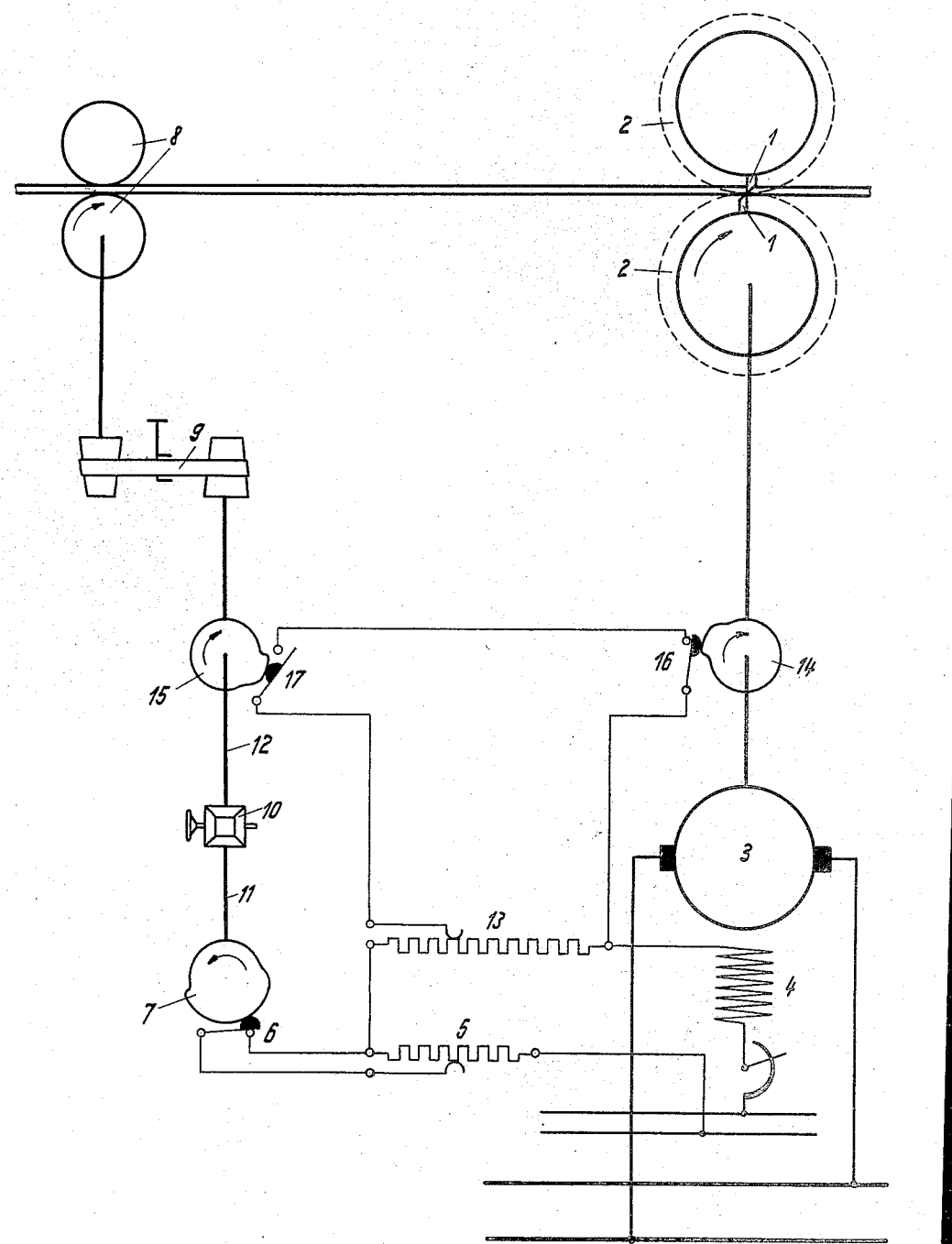
Inventor:
Hermann Nehlsen,
By ...
         atty.

UNITED STATES PATENT OFFICE 2,023,851

SPEED CONTROL FOR SHEARS FOR CUTTING ROLLED MATERIAL

Hermann Nehlsen, Dusseldorf-Meererbusch, Germany, assignor to Schloemann Aktiengesellschaft, Dusseldorf, Germany, a corporation of Germany Application August 22, 1934, Serial No. 740,867
In Germany August 28, 1933

3 Claims. (Cl. 164—68)

My invention relates to a speed control for shears for cutting rolled material into predetermined lengths while moving.

For this purpose, electrically driven shears have already been proposed which operate on the start and stop principle, that is to say, the shears are started for each individual cut anew. With this type of shears, any desired length can be cut at any rate of speed of the material, provided however that sufficient time is available for starting and stopping the shear motors between subsequent cutting operations. This requirement renders it very difficult to use that type of shears when short lengths are to be obtained from rapidly moving stock.

It has further been proposed to use continuously running shears, having blade carrying arms adjustable as to their radial distance from the axis of rotation of the shears so that the circumference of the circle described by the blades is varied and thereby also the length which is cut, it being understood that the speed of rotation of the blades and the relative distance of their axes of rotation will have to be reset so as to match the adjustment of the blade carrying arms. As the impacts and shocks which occur at each cut are transmitted to the adjusting mechanism, the latter must be of very heavy construction which renders it very cumbersome and also difficult to manipulate.

In another type of continuously running shears, various lengths are obtained by the accelerating or the retarding of the angular speed of the shear blades according to whether shorter or greater lengths than the circumference of the circle described by the rotating blades are desired. The uniform angular velocity of the blades is thus changed into a pulsating angular velocity, the pulsations taking place as often as their cuts and in the same time intervals or, in other words, with the rhythm of the cuts.

It is an object of my invention to provide a shear of the last mentioned type in which the means for controlling the angular velocity of the shear blades are purely electrical.

It is a further object of my invention to provide a shear of this type in which the pulsating angular movement is superposed to a uniform angular movement of constant speed even for a wide range of lengths.

It is a further object of my invention to provide a shear of this type in which the lengths can be adjusted and varied while the shear is running.

It is a further object of my invention to provide a shear of this type in which any deviations of the speed of the shear in the moment of cutting from the speed of the material will be automatically compensated.

Other objects of my invention will appear from the following description of one embodiment with reference to the drawing, the single figure of which is a more or less diagrammatic showing of the novel control means.

At 1 are shown the two blades of a rotary shear of any suitable construction which blades are driven by means of gears 2 from a motor 3, it being understood that a separate motor can be provided for each blade. In the present embodiment, the motor 3 is a direct current motor, having an exciter winding 4 and a variable resistance 5 in series with the winding. A contact 6 is arranged parallel to resistance 5 so as to shunt it when the contact is closed by a cam 7. The latter is driven by any suitable device such as feeding rolls 8 which have no slip relative to the movement of the material. A pair of cone pulleys 9 which also transmits its movement without slip is arranged intermediate cam 7 and feed rolls 8, which gear in the present embodiment comprises a pair of cone pulleys so that a continuous variation of their ratio is possible, but any other device by which a similar result can be obtained may be used instead.

The means above described operate in the following manner:

Assuming first that the contact 6 remains continuously in the open position, then the motor 3 will run at a constant speed, and the blades 1 will cut lengths which correspond exactly to the circumference of the circle described by the blades. Now let us assume that the contact 6 is closed for a certain length of time by cam 7. This has the effect that the resistance 5 will be partly shunted whereby the field of the motor 3 and the speed of the blades 1 during that time are varied. Thus, a pulsating angular movement of blades 1 is obtained, the degree of pulsation being determined by the adjustment of the resistance 5, and furthermore, the time intervals between subsquent cuttings will also be varied, thereby varying the length of the cuts.

If cam 7 were directly geared to the feed rolls 8, it would run with a constant speed for all adjustments of resistance 5, so that it would operate regardless of the average speed of the blades 1 and not with the rhythm of the cuttings as is required. Now in order to secure this feature, a pair of cone pulleys 9 is provided which permits the speed of the cam 7 to be so adjusted that the contact 6 will be actuated exactly upon each revolution of the blades 1. Both the adjustment of resistance 5 and the pair of cone pulleys 9 can be effected while the shear is running.

It is to be further understood that by a suitable timing of the gearing of cam 7 and blades 1 relative to each other, the closing of the contact 6 will only take place during the intervals between subsequent cuttings so that the synchronism between the movement of the blades and that of the material will not be disturbed.

Between the pair of cone pulleys 9 and cam 7 a differential gear 10 is provided, which enables the shaft 11 to be rotated relatively to shaft 12 so that the moment of actuation of contact 6 can be shifted with regard to the operations of blades 1 and the phase of the cutting can be shifted if desired.

The aforesaid control means will give very satisfactory results as long as the speed of the blades will be left unaffected. Now, it is a known fact that the energy required for the cutting will vary with the temperature of the material. This temperature cannot be kept constant for various reasons so that the load of the shear motor 3 and consequently its speed will vary and, the synchronism between the shear blades and the material and also the feeding rolls 8 and the aforedescribed mechanism will no longer prevail.

In order to overcome this difficulty, I provide means for synchronizing the speed of the shear blades with the material. This means comprises a cam 14 between motor 3 and the shear and a cam 15 arranged between cam 7 and the pair of cone pulleys 9, each cam actuating a contact 16 and 17 respectively. The two contacts are connected in series in a shunt circuit across a second variable resistance 13 which is connected in series to exciter winding 4. The cams 14 and 15 are so designed and timed that when the shear blades 1 run synchronously with the material, the contacts 16 and 17 will be closed together for a given time interval. This interval will change with the deviations of the blades 1 from synchronism by the variations of its exciting current.

It will be understood that any other means for establishing synchronism between the shear blades and the control mechanism can be used.

I claim as my invention:

1. In a speed control for shears of the type described, an electric motor for driving the shear blades with the linear speed of the rolled material to be cut at the instant of cutting, means for varying the speed of the motor in the intervals between the cutting operations, means responsive to the feed speed of the rolled material, the said speed varying means being driven by the said feed speed responsive means, and means for changing the speed ratio between the two last named means.

2. In a speed control for shears of the type described, an electric motor for driving the shear blades with the linear speed of the rolled material to be cut at the instant of cutting, means for varying the speed of the motor in the intervals between the cutting operations only, means responsive to the feed speed of the rolled material, the said speed varying means being driven by the said feed speed responsive means, and means for changing the angular relation between the two last named means.

3. In a speed control for shears of the type described, an electric motor for driving the shear blades with the linear speed of the rolled material to be cut at the instant of cutting, means for varying the speed of the motor in the intervals between subsequent cutting operations, means responsive to the feed speed of the rolled material, the said speed varying means being driven by the said feed speed responsive means, means for changing the speed ratio between the two last named means, means for rendering the said speed varying means effective with the rhythm of the cutting operations, and means for synchronizing the speed of said electric motor with that of the said speed varying means.

HERMANN NEHLSEN.